United States Patent [19]

Ksienysk et al.

[11] 3,907,122

[45] Sept. 23, 1975

[54] PUSH AND PULL DEVICE, ESPECIALLY FOR LIGHT RAIL VEHICLES AND CABIN VEHICLES

[75] Inventors: Klaus Ksienysk, Remscheid-Lennep; Barun Kumar Chatterjee, Remscheid, both of Germany

[73] Assignee: Bergische Stahl Industrie, Remscheid, Germany

[22] Filed: Aug. 21, 1974

[21] Appl. No.: 499,542

[30] Foreign Application Priority Data

Aug. 21, 1973 Germany............................ 2342099

[52] U.S. Cl. ...................... 213/14; 213/20; 213/69; 267/57.1 R; 267/150; 280/484
[51] Int. Cl.².......................................... B61G 5/00
[58] Field of Search ............ 213/12, 13, 14, 18, 19, 213/20, 21, 22, 45, 69, 40 R, 40 D, 40 S; 280/483, 484, 485; 403/131, 132, 133, 135; 267/57.1 R, 57.1 A, 150

[56] References Cited
UNITED STATES PATENTS
3,717,260  2/1973  Jeffrey.................................. 213/14

Primary Examiner—M. Henson Wood, Jr.
Assistant Examiner—Gene A. Church
Attorney, Agent, or Firm—Walter Becker

[57] ABSTRACT

A push and pull device, especially for light rail vehicles and cabin vehicles, which includes a housing having a first section for connection to a vehicle frame and also having a section with an inner substantially square cross section. A coupling rod extends through these first and second sections. An approximately ball-shaped body located in the first housing section surrounds the adjacent portions of the coupling rod, and elastic means are interposed between the first housing section and the ball-shaped body and have the latter nesting therein while elastic elements are respectively arranged in the corners of the interior of the second housing section and elastically clamp the adjacent portions of the coupling rod therebetween.

9 Claims, 2 Drawing Figures

PUSH AND PULL DEVICE, ESPECIALLY FOR LIGHT RAIL VEHICLES AND CABIN VEHICLES

The present invention relates to a pull and push device, especially for light rail vehicles and cabin vehicles. More specifically, the present invention relates to a pull and push device of the above identified type which permits a cardanic suspension of the coupling, the coupling rod of which is clamped between elastic material.

It is known to design the end of a coupling rod in the manner of a dish with approximately horizontal dish and to clamp said dish on both sides between elastic material, especially rubber, in order in this way to permit the intermediate adjustment in a vertical plane. The return of the coupling to the center in the horizontal plane is not easily possible. It is rather necessary to build in certain transmissions. This, however, is relatively expensive in light vehicles and similar instances of employment so that the return of the coupling and its linkage connection cannot be transferred to such light cases of employment.

It is, therefore, an object of the present invention to provide a light linkage connection which will be able not only to set the coupling in a vertical and horizontal plane on center, but will also permit a turning of the coupling about the longitudinal axis of the coupling while simultaneously returning it to its central position.

It is a further object of this invention to provide a linkage connection of the type set forth in the preceding paragraph which will admit axis parallel movements of the coupling without necessitating a special return movement thereof.

These and other objects and advantages of the invention will appear more clearly from the following specification, in connection with the accompanying drawing, in which.

The push and pull device according to the present invention is characterized primarily in that the rear portion of the coupling rod is provided with a ball-shaped thickened portion which is embedded in an elastic material, and is furthermore characterized in that the coupling rod is clamped between elastic elements arranged in the corners of a four-corner housing.

It is advantageous to arrange the ball-shaped thickened portion and/or the elastic elements on tubular means embracing the coupling rod.

Figure 1:
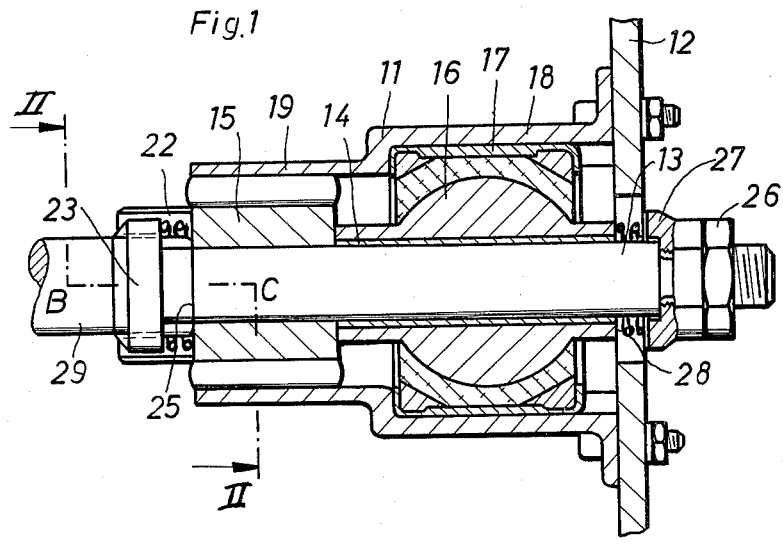
FIG. 1 is a vertical section through the linkage system according to the invention.
Figure 2:
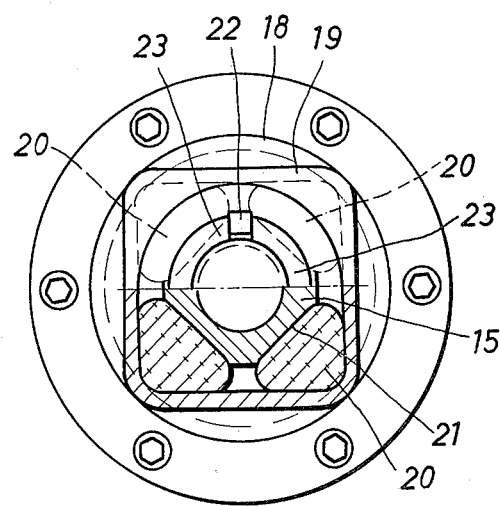
FIG. 2 represents a section taken along the line II—II of FIG. 1.

Referring now to the drawing in detail, the arrangement shown therein comprises a housing 11 provided on the vehicle frame 12. The entire linkage system and central return positioning means are arranged in the housing 11. The coupling rod 13 is extended through the housing 11 and protrudes at the rear end. On this part of the coupling rod 13 there are two separate pipes 14 and 15 movably and displaceably mounted. Arranged on pipe 14 there is provided a ball-shaped thickened portion 16 which is clamped in in housing 11 through the intervention of a layer 17 of rubber. This adjacent part 18 of the housing is cylindrical. The adjacent part 19 of the housing is provided with four corners, as shown in FIG. 2, while a rubber element 20 is clamped into each corner of this housing. This rubber element 20 rests against a flattened portion 21 on pipe 15. Arranged on pipe 15 are two diametrically oppositely located wedges 22 which protrude from the housing 19 and are located in the grooves of a flange 23 arranged on the pull rod 13. Flange 23 has a certain distance from the front end 24 of pipe 15. An additional flange 27 is connected to the rear end of pull rod 13 by means of a nut 26. The flange 27 likewise has a certain distance from the front surface 28 of pipe 14 and the thickened portion 16 which is continued up to said surface 28.

The coupling rod is so suspended that it can cardanically move in the center point of the ball-shaped thickened portion 16. The horizontal and vertical setting is effected by means of the elastic elements 20 which are clamped into the corners of the housing 11. In this way, those elements 20 are compressed which are located in the direction in which the pull rod 13 can be pivoted out. A turning of the coupling about the longitudinal axis 29 of the coupling rod is by means of flange 23 transmitted to the wedges 22 and from there through pipe 15 likewise to the elastic elements 20 which are compressed by the flattened portions 21 in response to a turning of the coupling rod. Also, in this instance, the return of the coupling rod to center position is effected after the turning or torsion force has ceased. During the occurring torsion of the pull rod 13, the ball-shaped thickened portion 16 is not subjected to any material stresses, but is only slightly subjected to stresses in response to the pivoting of the pull rod 13 in the horizontal or vertical plane. When a push is exerted upon the coupling, the coupling rod is displaced toward the right freely in the pipes 14 and 15 until the flange 23 abuts against the front surface of pipe 15. Only then a slight displacement of pipe 15 will occur which after the pushing force has ceased will again be returned to central position. The conditions are, of course, reversed when pulling forces occur, because in such an instance, the flange 27 is pulled up to the surface 28. In such an instance, only a slight additional movement is possible, which however, is set back again because the elastic intermediate layer 17 is subjected to stresses. Due to the connection of the pull rods 13 with the pipe 15 through the intervention of flange 23 and wedges 22, the pull rod after effected torsion will, in any desired horizontal position, be returned to its central position.

Expediently, between the flange 23 of the surface 25, as well as between the flange 27 and the surface 28, a relatively soft spring is interposed so that also a certain return to the central position will be possible in axis-parallel direction of the pull rod.

Normally, a returning to this position is not necessary because the motors of the individual cabins or rail vehicles will only when starting cause a different acceleration, which brings about a displacement of the two cabins relative to each other. If, however, this is not necessary, also stronger springs may be built in so that a genuine central return in axial direction will be assured, while simultaneously an energy supply for push and pull forces will be possible.

Inasmuch as it may happen that the elastic elements fatigue due to use over a longer period, it is expedient so to mount the housing on the vehicle that it can be inclined relative to the vehicle so that the coupling will be located in a relatively narrow coupling range.

As will be evident from the above, the advantage of the device according to the present invention is seen primarily in that the linkage system comprises a cardanic joint which is adapted to be subjected to rods in all planes and automatically returns itself to its starting position. The necessary idling stroke of the pull rod along the longitudinal axis of the vehicle can be adapted to the specific requirements. To this end, a relatively soft spring may be provided, which, however, is not necessary under all circumstances, because the purpose of the idling stroke consists in that the longitudinal forces have to be absorbed which occur during the start by the synchronous drive, and an increase in the longitudinal forces by a swinging back and forth as well as an undesired pulling between the cabins or between the vehicles is to be avoided. In addition thereto, this pull and push device according to the invention is easily installed in a single housing while the elements for effecting the central return positioning consists of known elastic blocks, the properties of which are well known to the expert in the art. In addition thereto, this linkage system is light and simple, and nevertheless, is safe in operation so that the safety requirements are fully met.

It is, of course, to be understood that the present invention is, by no means, limited to the specific showing in the drawing, but also comprises any modifications within the scope of the appended claims.

What we claim is:

1. A push and pull device for light rail and cabin vehicles, which includes: housing means having a first section for connection to a vehicle frame and also having a second section with an inner substantially square cross section, a coupling rod extending through said first and second sections, an approximately ball-shaped body located in said first housing section and surrounding the adjacent portion of said coupling rod, elastic means interposed between said first housing section and said ball-shaped body and having the latter nesting therein, and elastic elements respectively arranged in the corners of the interior of said second housing section, that portion of said coupling rod which passes through said second housing section being elastically clamped between said elastic elements.

2. A device according to claim 1, which includes a tubular member surrounding that portion of said coupling rod which is located in said first housing section, said tubular member supporting said ball-shaped body.

3. A device according to claim 1, which includes a tubular element located in said second housing section and surrounding that portion of said coupling rod which passes through said second housing section, said elastic elements being clamped in between the interior of said second housing section and outer circumferential surface portions of said tubular element.

4. A device according to claim 1, in which that portion of said coupling rod which extends through said second housing section has an outer contour, the cross section of which defines a square, the thus defined flat surfaces of said outer contour respectively being engaged by said elastic elements.

5. A device according to claim 1, which includes means associated with said coupling rod for preventing said coupling rod from rotation while permitting said coupling rod to axially move back and forth.

6. A device according to claim 3, which includes a flange connected to said coupling rod and provided with peripheral grooves, and extension means connected to said tubular element and slideably engaging said peripheral grooves.

7. A device according to claim 2, in which that portion of said coupling rod which is remote from said second housing section and projects outwardly from said tubular member is provided with a first collar, and in which that portion of said coupling rod which is remote from said first housing section is provided with a second collar, said device also including first abutment means associated with ball-shaped body for abutment with said first collar to limit the stroke of said coupling rod in a first direction, and second abutment means associated with said elastic elements for abutment with said second collar to limit the stroke of said coupling rod in a second direction opposite to said first direction.

8. A device according to claim 1, in which said housing means is with a variable inclination adjustably connectible to a vehicle.

9. A device according to claim 7, which includes spring means respectively associated with said first and second collar and continuously urging said coupling rod to assume a central position between said collars.

* * * * *